(12) United States Patent
Hanson

(10) Patent No.: US 11,478,740 B2
(45) Date of Patent: Oct. 25, 2022

(54) HELICAL FLOW FILTER

(71) Applicant: HAMILTON SUNDSTRAND CORPORATION, Charlotte, NC (US)

(72) Inventor: Thomas David Hanson, Houston, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 462 days.

(21) Appl. No.: 16/435,984

(22) Filed: Jun. 10, 2019

(65) Prior Publication Data
US 2020/0384399 A1   Dec. 10, 2020

(51) Int. Cl.
| | |
|---|---|
| *B01D 46/00* | (2022.01) |
| *B64G 1/60* | (2006.01) |
| *B64G 1/46* | (2006.01) |
| *B01D 53/04* | (2006.01) |
| *B01D 46/30* | (2006.01) |
| *B01D 53/02* | (2006.01) |

(52) U.S. Cl.
CPC ..... *B01D 46/0046* (2013.01); *B01D 46/0038* (2013.01); *B01D 46/30* (2013.01); *B01D 53/02* (2013.01); *B64G 1/60* (2013.01); *B01D 2253/102* (2013.01); *B01D 2259/4575* (2013.01)

(58) Field of Classification Search
CPC ............ B01D 46/0038; B01D 46/0046; B01D 46/30; B01D 53/02; B01D 2259/4575; B01D 2253/102; B01D 2253/104; B01D 2253/106; B01D 2253/108; B01D 2253/1085; B01D 2253/11; B01D 2253/116; B01D 46/106; B01D 46/2496; B01D 2257/90; B01D 53/0407; B01D 53/0446; B64G 1/46; B64G 1/48; B64G 1/60
See application file for complete search history.

(56) References Cited

FOREIGN PATENT DOCUMENTS

| | | | |
|---|---|---|---|
| AT | 0222731 A2 * | 5/1987 | ......... B01D 53/0423 |
| DE | WO2017198466 A1 * | 11/2017 | ......... B01D 53/0446 |

OTHER PUBLICATIONS

EP0222731A2_ENG (Espacenet machine translation of Buttinger) (Year: 1987).*
WO2017198466A1_ENG (Espacenet machine translation of Stell) (Year: 2017).*

* cited by examiner

*Primary Examiner* — Gabriel E Gitman
(74) *Attorney, Agent, or Firm* — Cantor Colburn LLP

(57) ABSTRACT

A filter includes a filter outer wall, and a filter inner wall spaced apart from the filter outer wall. The filter inner wall and the filter outer wall define a filter void therebetween, and the filter inner wall and the filter outer wall extend along a filter axis. A volume of filtration material is positioned in the filter void, and a plurality of baffles extend between the filter inner wall and the filter outer wall. The plurality of baffles are configured to induce a helical component to an airflow entering the filter void at a first void end relative to the filter axis and exiting the filter void at a second void end opposite the first void end.

20 Claims, 2 Drawing Sheets

HELICAL FLOW FILTER

STATEMENT OF FEDERAL SUPPORT

This invention was made with Government support under contract NNH16CO87C awarded by the National Aeronautics and Space Administration (NASA). The Government has certain rights in the invention.

BACKGROUND

Exemplary embodiments pertain to the art of filtration systems.

A forced airflow filtration system with significant size and weight constraints is challenged to adequately filter contaminated air. For example, a spacecraft waste disposal system, i.e. toilet, requires airflow to "vacuum" urine and fecal materials away from the body for disposal because the system must function without the aid of gravity. The airflow utilized is drawn from a crew cabin of the spacecraft and then returned to the crew cabin. An air filter is utilized to remove odors and other contaminants from the airflow before returning the airflow to the crew cabin. The amount of odor and other contaminants that can be removed from the airflow is related to the "residence time" of the contaminated airflow in the filter.

Typically, space constraints on the filter size, along with requirements to provide sufficient airflow, limit the residence time of the contaminated airflow in the filter. If the filter is not adequately sized, and cannot effectively filter the airflow, the filter will not be able to remove all of the odor and contaminants, which will be a nuisance to the crew and could be harmful to their health.

BRIEF DESCRIPTION

In one embodiment, a filter includes a filter outer wall, and a filter inner wall spaced apart from the filter inner wall. The filter inner wall and the filter outer wall define a filter void therebetween, and the filter inner wall and the filter outer wall extend along a filter axis. A volume of filtration material is positioned in the filter void, and a plurality of baffles extend between the filter inner wall and the filter outer wall. The plurality of baffles are configured to induce a helical component to an airflow entering the filter void at a first void end relative to the filter axis and exiting the filter void at a second void end opposite the first void end.

Additionally or alternatively, in this or other embodiments the filter inner wall and the filter outer wall have coaxial circular cross-sections centered on the filter axis.

Additionally or alternatively, in this or other embodiments each baffle of the plurality of baffles extends curvilinearly from the first void end to the second void end.

Additionally or alternatively, in this or other embodiments the plurality of baffles are equally-spaced about the filter void.

Additionally or alternatively, in this or other embodiments the plurality of baffles are secured to at least one of the inner filter wall and the outer filter wall.

Additionally or alternatively, in this or other embodiments a retainer is locate at at least the first void end and the second void end to retain the volume of filtration material in the filter void.

Additionally or alternatively, in this or other embodiments the volume of filtration material includes activated charcoal.

Additionally or alternatively, in this or other embodiments the filter is formed as a single unitary element.

Additionally or alternatively, in this or other embodiments the filter is formed via additive manufacturing.

Additionally or alternatively, in this or other embodiments the plurality of baffles are configured to increase a residence time of the airflow in the filter void.

In another embodiment, a waste disposal system includes a waste inlet and a waste transfer tube extending from the waste inlet. A collection canister is connected to the waste inlet via the waste transfer tube. A suction airflow is directed through the waste transfer tube to urge waste through the waste inlet and along the waste transfer tube to the collection canister. The suction airflow is directed through a filter for removal of odor and/or other contaminants from the suction airflow. The filter includes a filter outer wall and a filter inner wall spaced apart from the filter inner wall. The filter inner wall and the filter outer wall define a filter void therebetween. The filter inner wall and the filter outer wall extend along a filter axis and a volume of filtration material disposed in the filter void. A plurality of baffles extend between the filter inner wall and the filter outer wall. The plurality of baffles are configured to induce a helical component to the suction airflow entering the filter void at a first void end relative to the filter axis and exiting the filter void at a second void end opposite the first void end.

Additionally or alternatively, in this or other embodiments the filter inner wall and the filter outer wall have coaxial circular cross-sections centered on the filter axis.

Additionally or alternatively, in this or other embodiments each baffle of the plurality of baffles extends curvilinearly from the first void end to the second void end.

Additionally or alternatively, in this or other embodiments the plurality of baffles are equally-spaced about the filter void.

Additionally or alternatively, in this or other embodiments the plurality of baffles are secured to at least one of the inner filter wall and the outer filter wall.

Additionally or alternatively, in this or other embodiments a retainer is located at at least one of the first void end and the second void end to retain the volume of filtration material at the filter void.

Additionally or alternatively, in this or other embodiments the volume of filtration material includes activated charcoal.

Additionally or alternatively, in this or other embodiments the filter is formed as a single unitary element via additive manufacturing.

Additionally or alternatively, in this or other embodiments the waste disposal system is configured for use on a spacecraft.

In yet another embodiment, a method of operating a waste disposal system includes urging a suction airflow through a waste inlet, urging waste through the waste inlet and along a waste transfer tube extending from the waste inlet via the suction airflow, and directing the suction airflow through a filter. The filter includes a filter outer wall and a filter inner wall spaced apart from the filter inner wall. The filter inner wall and the filter outer wall define a filter void therebetween, and the filter inner wall and the filter outer wall extending along a filter axis. A volume of filtration material is located in the filter void, and a plurality of baffles extend between the filter inner wall and the filter outer wall. A helical component is induced to the suction airflow entering the filter void at a first void end relative to the filter axis and exiting the filter void at a second void end opposite the first void end via the plurality of baffles, thereby increasing a residence time of the suction airflow in the filter void.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
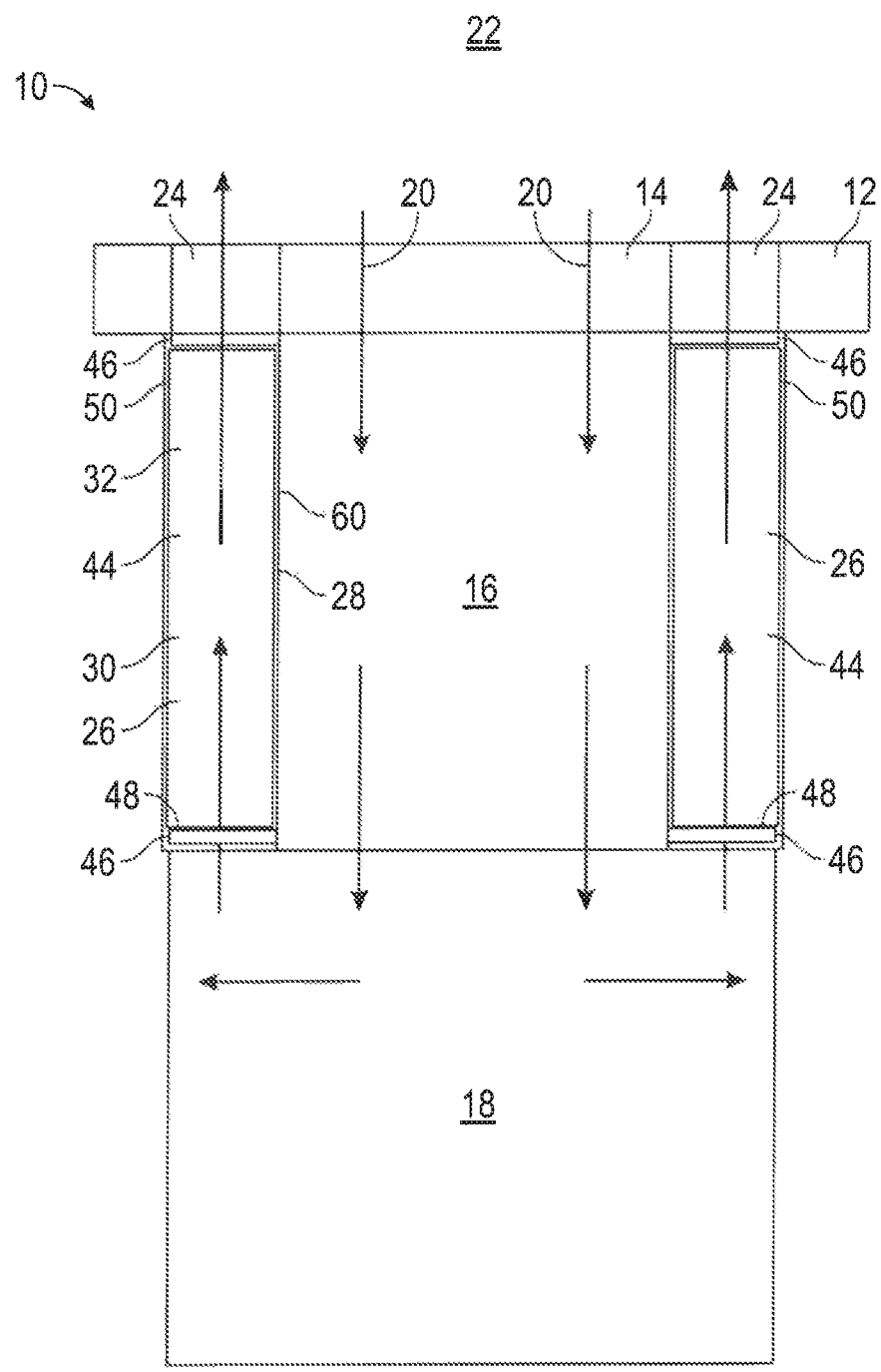
FIG. 1 is a schematic illustration of an embodiment of a waste disposal system.

Referring to FIG. 1, shown is a partial schematic illustration of a waste disposal system 10. The waste disposal system 10 includes a seat 12, having a seat opening 14, the seat opening 14 operating as a waste inlet to the waste disposal system 10. A waste transfer tube 16 extends from the seat opening 14 toward a collection canister 18. In operation, a suction airflow 20 drawn from a crew cabin 22 or other space of a vehicle such as a spacecraft, urges waste through the seat opening 14 and through the waste transfer tube 16 to the collection canister 18. The waste may be compacted at the collection canister 18 through operation of a compactor (not shown), or otherwise prepared for disposal. The suction airflow 20 proceeds to one or more airflow outlets 24 for reintroduction to the crew cabin 22.

Figure 2:
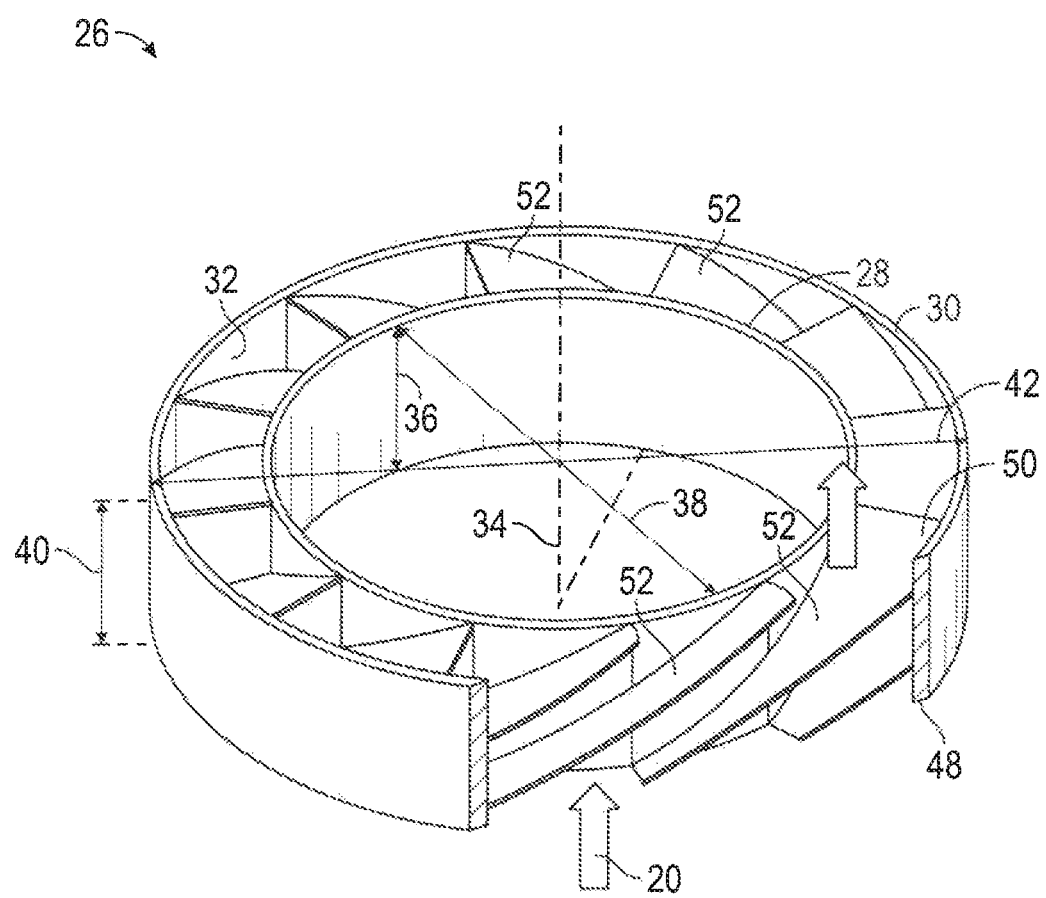
FIG. 2 is a partial cross-sectional view of an embodiment of a filter for a waste disposal system.

A filter 26 surrounds the waste transfer tube 16. The suction airflow 20 is directed through the filter 26 before reintroduction to the crew cabin 22 to remove odors and other contaminants from the suction airflow 20. Referring now to FIG. 2, an embodiment of a filter 26 is shown in more detail. The filter 26 is substantially tubular, or more specifically a rectangular toroid, having a filter inner wall 28 and a filter outer wall 30 spaced apart from one another to define a filter void 32 therebetween. In some embodiments, the filter inner wall 28 has a circular cross-section centered on a filter axis 34. The filter inner wall 28 has an inner wall length 36 parallel to the filter axis 34. In some embodiments, the inner wall diameter 38 may be zero.

Similarly, the filter outer wall 30 may have a circular cross-section centered on the filter axis 34, and is coaxial with the filter inner wall 28. The filter outer wall 30 has an outer wall length 40 parallel to the filter axis 34. In some embodiments. The outer wall length 40 is equal to the inner wall length 36.

Referring again to FIG. 1, the filter 26 is located around the waste transfer tube 16 such that the filter inner wall 28 abuts a tube wall 60 of the waste transfer tube 16. A volume of filtration material 44 is disposed in the filter void 32 between the filter inner wall 28 and the filter outer wall 30. A retainer 46, such as a screen, or perforated plate, or other material is disposed at a first void end 48 and a second void end 50 of the filter void 32 to retain the filtration material 44 therein, while still allowing the suction airflow 20 to pass therethrough. In some embodiments, the filtration material 44 is, for example, an activated charcoal material to remove odors and other contaminants from the suction airflow 20. In some embodiments, the filtration material 44 is, for example, a tightly woven glass fiber mesh to remove contaminants from the suction airflow 20. It is to be appreciated, however, that in other embodiments other materials may be utilized, for example, paper, glass fiber or polyurethane foam.

Referring again to FIG. 2, for sake of clarity the filtration material 44 is not shown. A plurality of baffles 52 are arranged in the filter void 32. The baffles 52 are configured and arranged about the filter void 32 to induce a helical component to the suction airflow 20 passing through the filter 26, such that the airflow direction is not purely in the direction parallel to the filter axis 34. Such a helical airflow pattern increases the residence time of the suction airflow 20 in the filter void 32, and as such increases an interaction time of the suction airflow 20 with the filtration material 44.

The baffles 52 extend from the first void end 48 to the second void end 50, and between the filter inner wall 28 and the filter outer wall 30. In some embodiments the baffles 52 are secured to one or both of the inner filter wall 28 and the outer filter wall 30.

In some embodiments, the baffles 52 are planar extending from the first void end 48 to the second void end 50 at a constant angle relative to, for example, the first void end 48, while in other embodiments, such as shown in FIG. 2, the baffles 52 extend curvilinearly between the first void end 48 and the second void end 40. In still other embodiments, the baffles 52 may be configured to have a combination of linear portions between the first void end 48 and the second void end 50.

In some embodiments, such as shown in FIG. 2, the baffles 52 are equally spaced around the filter axis 34, while in other embodiments the spacing may vary to accommodate, for example, circumferential variations in the suction airflow 20. Similarly, while in the embodiment of FIG. 2 the baffles 52 are identical, in other embodiments the baffles 52 may vary relative to one another in shape, radial width, axial length or other properties.

In some embodiments, the filter 26 is formed by traditional manufacturing methods such as machining, welding or the like. In other embodiments, the filter is formed as a single piece unitary element via additive manufacturing. Further, while described herein in the context of waste disposal system 10, one skilled in the art will readily appreciate that such a filter 26 may be utilized in many applications where filtration of forced airflow is needed with constraints on size and weight of the filtration apparatus.

The helical airflow pattern increases residence time of the suction airflow 20 in the filter void 42 and therefore in contact with the filtration material 44, without increasing the overall size or mass of the filter 26. Thus, more odor and other contaminants may be removed by the filter 26 for a given filter 26 volume and mass. Further, the baffles 52 add structural strength to the filter 26 allowing the filter 26 to be lighter weight overall, while still withstanding required dynamic loads and fatigues experienced by spaceflight hardware.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A filter comprising:
   a filter outer wall;
   a filter inner wall spaced apart from the filter outer wall, the filter inner wall and the filter outer wall defining a filter void therebetween, the filter inner wall and the filter outer wall extending along a filter axis, the filter inner wall being configured to receive an airflow entering the filter;
   a volume of filtration material disposed in the filter void; and
   a plurality of baffles extending between the filter inner wall and the filter outer wall, the plurality of baffles configured to induce a helical component to the airflow, the airflow entering the filter void at a first void end relative to the filter axis and exiting the filter void at a second void end opposite the first void end.

2. The filter of claim 1, wherein the filter inner wall and the filter outer wall have coaxial circular cross-sections centered on the filter axis.

3. The filter of claim 1, wherein each baffle of the plurality of baffles extends curvilinearly from the first void end to the second void end.

4. The filter of claim 1, wherein the plurality of baffles are equally-spaced about the filter void.

5. The filter of claim 1, wherein the plurality of baffles are secured to at least one of the filter inner wall and the filter outer wall.

6. The filter of claim 1, further comprising a retainer at at least the first void end and the second void end to retain the volume of filtration material in the filter void.

7. The filter of claim 1, wherein the volume of filtration material includes activated charcoal.

8. The filter of claim 1, wherein the filter inner wall, the filter outer wall and the plurality of baffles are formed together as a single unitary element.

9. The filter of claim 8, wherein the filter inner wall, the filter outer wall and the plurality of baffles are formed together via additive manufacturing.

10. The filter of claim 1, wherein the plurality of baffles are configured to increase a residence time of the airflow in the filter void.

11. A waste disposal system, comprising:
    a waste inlet;
    a waste transfer tube extending from the waste inlet;
    a collection canister connected to the waste inlet via the waste transfer tube, wherein the waste disposal system is configured to provide a suction airflow directed through the waste transfer tube to urge waste through the waste inlet and along the waste transfer tube to the collection canister; and
    a filter through which the suction airflow is directed for removal of odor and/or other contaminants from the suction airflow, the filter including:
      a filter outer wall;
      a filter inner wall spaced apart from the filter outer wall, the filter inner wall and the filter outer wall defining a filter void therebetween, the filter inner wall and the filter outer wall extending along a filter axis;
      a volume of filtration material disposed in the filter void; and
      a plurality of baffles extending between the filter inner wall and the filter outer wall, the plurality of baffles configured to induce a helical component to the suction airflow entering the filter void at a first void end relative to the filter axis and exiting the filter void at a second void end opposite the first void end.

12. The waste disposal system of claim 11, wherein the filter inner wall and the filter outer wall have coaxial circular cross-sections centered on the filter axis.

13. The waste disposal system of claim 11, wherein each baffle of the plurality of baffles extends curvilinearly from the first void end to the second void end.

14. The waste disposal system of claim 11, wherein the plurality of baffles are equally-spaced about the filter void.

15. The waste disposal system of claim 11, wherein the plurality of baffles are secured to at least one of the filter inner wall and the filter outer wall.

16. The waste disposal system of claim 11, further comprising a retainer at at least one of the first void end and the second void end to retain the volume of filtration material in the filter void.

17. The waste disposal system of claim 11, wherein the volume of filtration material includes activated charcoal.

18. The waste disposal system of claim 11, wherein the filter inner wall, the filter outer wall and the plurality of baffles are formed together as a single unitary element via additive manufacturing.

19. The waste disposal system of claim 11, wherein the waste disposal system is configured for use on a spacecraft.

20. A method of operating a waste disposal system, comprising:
    urging a suction airflow through a waste inlet;
    urging waste through the waste inlet and along a waste transfer tube extending from the waste inlet via the suction airflow;
    directing the suction airflow through a filter, the filter including:
      a filter outer wall;
      a filter inner wall spaced apart from the filter outer wall, the filter inner wall and the filter outer wall defining a filter void therebetween, the filter inner wall and the filter outer wall extending along a filter axis;
      a volume of filtration material disposed in the filter void; and
      a plurality of baffles extending between the filter inner wall and the filter outer wall; and
    inducing a helical component to the suction airflow entering the filter void from the waste inlet at a first void end relative to the filter axis and exiting the filter void at a second void end opposite the first void end via the plurality of baffles, thereby increasing a residence time of the suction airflow in the filter void.

* * * * *